United States Patent [19]

Duff et al.

[11] 3,743,792

[45] July 3, 1973

[54] MESSAGE WAITING LAMP ARRANGEMENT

[75] Inventors: Frank Duff, Arvada; James Louis Simon, Northglenn, both of Colo.

[73] Assignee: Bell Telephone Laboratories Incorporated, Murray Hill, N.J.

[22] Filed: Sept. 15, 1971

[21] Appl. No.: 180,544

[52] U.S. Cl. .................... 179/84 C, 179/99, 179/37

[51] Int. Cl. .................... H04m 1/26

[58] Field of Search .................... 179/84 C, 84 L

[56] References Cited

UNITED STATES PATENTS

| | | | |
|---|---|---|---|
| 3,564,148 | 2/1971 | Lee | 179/84 L |
| 3,532,832 | 10/1970 | Hestad | 179/84 C |
| 3,050,592 | 8/1962 | Burgener | 179/84 C |
| 2,884,491 | 4/1959 | Breen | 179/84 L |

*Primary Examiner*—Kathleen H. Claffy
*Assistant Examiner*—Alan Farber
*Attorney*—W. L. Keefauver et al.

[57] ABSTRACT

A "message waiting" facility is disclosed for key telephone systems. The facility connects directly to station sets and is controlled by momentary key depressions in a preordered sequence to light or extinguish visual indicators at the called and calling sets.

9 Claims, 1 Drawing Figure

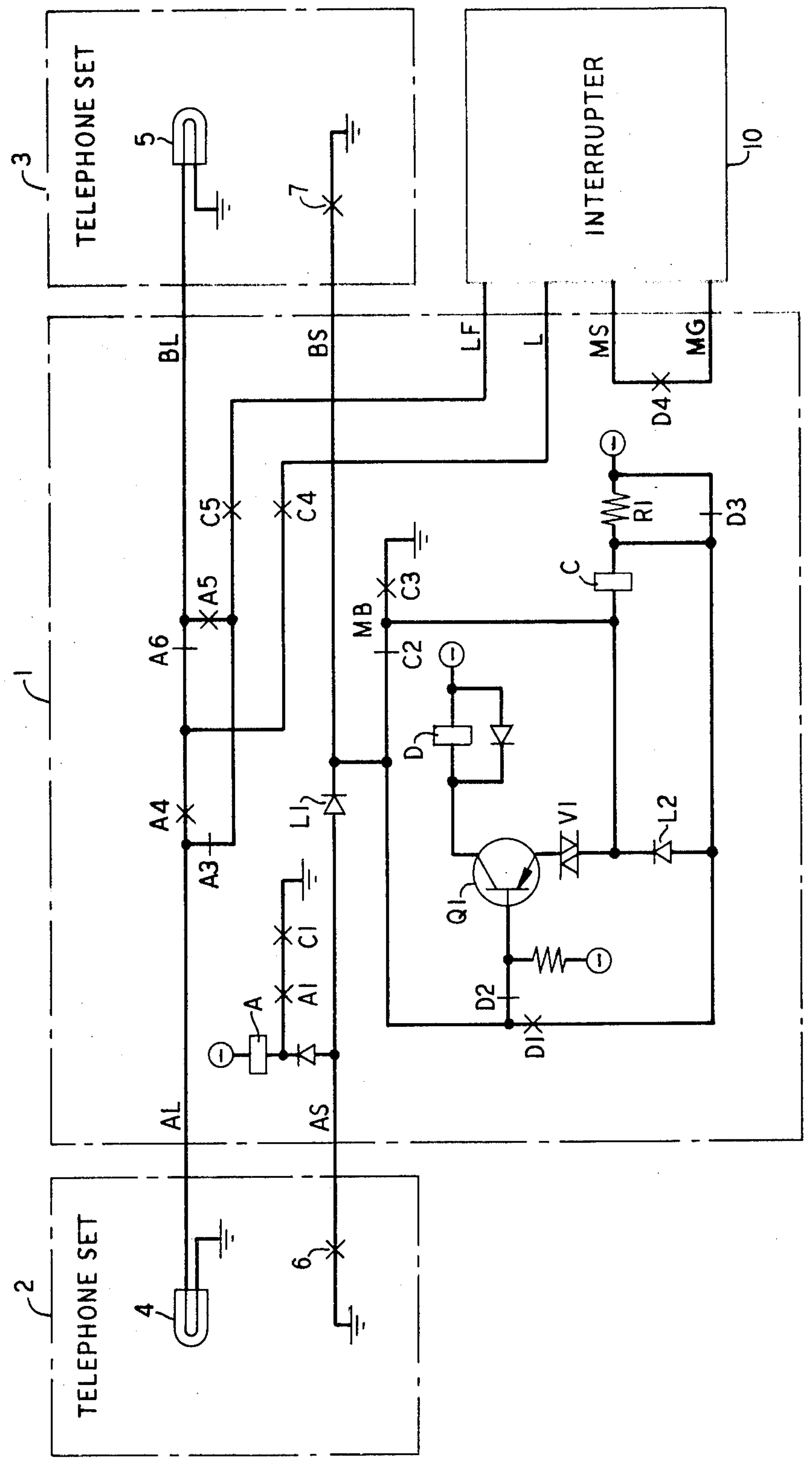
TELEPHONE SET
INTERRUPTER
TELEPHONE SET

MESSAGE WAITING LAMP ARRANGEMENT

BACKGROUND OF THE INVENTION

This invention relates to "message waiting" facilities for key telephone stations.

The occasion often arises where one key telephone station sharing station lines with another station desires to pass a signal to the other station that a message is being held for him. In the past, it was necessary for the subscriber to dispatch a written message, if the distance was not too great, or otherwise attempt to establish telephone contact by dialing the other station. A message-waiting signal is a preferred alternative because it immediately gives a positive manifestation at the called station which will be readily recognized and which will prompt a return call.

Various arrangements have been devised to furnish message-waiting visual indications. In one such arrangement, where calls to stations are completed through a switchboard, the attendant may leave a visual message for a station subscriber by connecting a message-waiting signal to the subscriber line using the cord switchboard apparatus. A lamp is bridged across the line at the station set and it responds to the signal to indicate the message-waiting condition. Another arrangement which is used principally in private intercom systems comprises a simple locking key furnished at one station and directly wired to a lamp at another station. Operation of the key lights the lamp in a straightforward manner giving a message-waiting indication. Both of these prior art arrangements accomplish the basic task but they are deficient because in the latter case only the signal originator can extinguish the lamp and, in the former, complex and expensive circuitry is used to control lamp signals.

Accordingly, it is an object of the present invention to overcome such prior art deficiencies and to provide an improved arrangement for message signaling between key telephone stations. It is a further object of this invention to provide an arrangement in which (a) the message originator as well as the called station concurrently receive distinctive visual indications and (b) the signaling paths as well as the station equipment are used bidirectionally in furnishing visual indications.

SUMMARY OF THE INVENTION

These and other objects of the invention are attained in accordance with an exemplary embodiment thereof in which our message-waiting facility is connected to two key telephone station sets, by way of illustration, and operative from either station set to signal the opposite station. Importantly, this facility functions with a single key and lamp at each station set and is operated over two conductors thereby minimizing the cost of our system. The single nonlocking key at each station serves a plurality of functions—such as, signaling the opposite station, extinguishing the signal at the opposite station, and extinguishing a local message-waiting signal. The single lamp serves as a message waiting indication lamp and as a system status indication lamp.

The facility includes a pulse counter which responds to consecutive operations of the station keys to advance a lamp control circuit in a preordered sequence. It also includes a pulse direction sensor so as to record the particular station from which a key originated pulse is sent and thereby direct lamp control voltages in accordance with this sequence to the correct station set lamp. The counter and sensor cooperate to produce the message-waiting indications as well as the status indications at both stations concurrently.

Accordingly, it is a feature of this invention to provide circuitry responsive to key generated signals from either one of two key stations to effect changes in visual signals at both stations following a preordered sequence.

DESCRIPTION OF THE DRAWING

The foregoing objects, features, and advantages, as well as others of our invention, will be more apparent from the following description of the drawing in which there is depicted lamps and keys of two station sets together with message-waiting control circuitry.

DETAILED DESCRIPTION

In the drawing, there is shown a single dual message-waiting lamp control circuit 1 which connects to telephone sets 2 and 3. At each set, there is provided message-waiting lamps 4 and 5 and nonlocking control keys 6 and 7 which are used by the subscriber to change the states of message-waiting lamps 4 and 5. Circuit 1 comprises a counter made up of transistor Q1 and relays C and D. These latter devices respond to key originated signals sent from the station set 2 or 3 to control lamps 4 and 5. Relay A and its associated circuitry indicates the source of a key signal.

To initiate a signal, for example, at set 3, utilizing key 6 at set 2, the following circuit operations take place. It is assumed initially that lamps 4 and 5 are dark, or not connected to a lamp supply voltage. Upon depression of key 6 at set 2, ground is connected to lead AS for operating relay A. At contact A1 a path is prepared for holding relay A upon the operation of relay C. Ground on lead AS may be traced via diode L1 and contact C2 to the winding of relay C which operates from the battery supplied through contact D3. In operating, relay C at its contact C1 locks relay A operated and at its contact C3 provides a holding ground for relay C. When ground is removed from lead AS upon the release of key 6, transistor Q1 turns on and relay D operates. Specifically, contact C3 connects ground to the junction of varistor V1 and diode L2 providing forward-biased current for the emitter base junction of transistor Q1. In operating, relay D isolates the base junction of transistor Q1 from leads AS and BS to prevent release of that relay when key 6 or 7 at either station is next depressed. In addition, contact D3 in operating, connects resistor R1 in series with the operated winding of relay C preparatory to the release of that relay in a a shunt-down configuration.

With reference to the top center of the drawing figure, operated contacts A5 and C5 connect lamp supply voltage LF (Lamp Flashing Rate) via lead BL to lamp 5. At the same time, a steady lamp signal is connected by contacts C4 and A4 over lead AL to lamp 4. The steady lamp indication of lamp 4 shows that the message-waiting indication has been set at station set 3.

A subsequent operation of either key 6 or key 7 will extinguish the lamps at both locations. If key 6 or 7 is depressed, ground is connected via lead AS or BS and contact D1 to the junction of resistor R1 and the winding or relay C causing relay C to release. If key 7 is depressed, relay A releases when contact C1 opens. The ground on lead BS does not maintain relay A operated because diode L1 blocks ground from being connected to the winding of relay A. On the other hand, if key 6 is operated, ground is connected to the junction of resistor R1 and relay C releasing that relay, but relay A is maintained operated until the ground is removed by the release of key 6.

When key 6 or 7 is released, transistor Q1 turns off, releasing relay D. Relay D functions under these circumstances to prevent a reoperation of relay C upon the release of the keys at station set 2 or 3. Contact D4 opens to remove a control path for Interrupter 10. Interrupter 10 supplies the flashing rate voltage, LF, for the lamps at the respective stations. Specifically, after relay C releases, ground for maintaining transistor Q1 operated is supplied via contact C2 and varistor V1. In releasing the key, causing the contact thereat to open, this ground is removed, disconnecting ground from the emitter of transistor Q1 removing the source of current from the winding of relay D.

In the event lamp 5, for example, at station Set 3 is flashing, indicating a message is being held by the subscriber at Set 2, as described above, depression of key 7 once will extinguish the lamp at that set and extinguish lamp 4 at Set 2. A second operation of key 7 will reverse the situation, causing a flashing lamp indication at lamp 4 and a steady lamp indication at lamp 5. Advantageously, this occurs because the countercircuit comprising relays C and D and transistor Q1 are completely cycled upon receiving two consecutive pulses on either leads AS or BS.

In the illustrative embodiment of the invention, the message-waiting system is disclosed as working with two key telephone sets. It will, however, be appreciated that the arrangement can be extended in multiple to many key telephone sets to expand the number of stations having the visual signals. Moreover, although the message-waiting signal is described in terms of incandescent lamps, it will also be appreciatd that other devices—such as, electroluminescent diodes—can be substituted without departing from the scope and intent of this invention.

What is claimed is:

1. A message waiting indication arrangement for key telephone stations each equipped with a signaling key comprising, means responsive to depression of said key at an originating one of said stations for causing a visual message waiting indication at a called one of said stations, means concurrently responsive to said key depression for providing a visual status indication at said originating station to indicate that a message waiting visual indication is activated at said called station, means monitoring a signaling path connected to both the originating and called stations being responsive to a subsequent key depression at either station, and means responsive to said monitoring means for disabling said providing means thereby extinguishing all visual indications when the next key depression is detected on said path.

2. The invention recited in claim 1 wherein a separate key is furnished at each one of said stations both to activate and to extinguish visual indications at a preselected called station.

3. The invention recited in claim 1 wherein a single visual indicating device is furnished at each one of said stations, and said device is utilized both for visual status indications as well as message waiting indications.

4. The invention recited in claim 3 further including means interposed in said signaling path for identifying the particular one of said stations at which a key is depressed, a signal generator having two distinct outputs corresponding to the message waiting and to the status indications, and wherein said identifying means directs the connection of said distinctive outputs respectively to said called and said originating stations.

5. A message waiting visual indicating arrangement for two key telephone stations each equipped with a signaling key comprising, a lamp signaling path as well as a key signaling path extending from each of said stations, means connected to each of said key signaling paths for detecting key depressions at said stations, a signal generator having a first and a second signal output, means responsive to said detecting means for connecting said first signal output to the lamp signaling path associated with a called one of said stations and said second signal output to the lamp signal path associated with an originating one of said stations at which a key is depressed, said called station having a visual device activated by said first signal output to produce a message waiting signal, and said originating station having a visual device activated by said second signal output to produce a status indication.

6. The invention recited in claim 5 wherein said detecting means includes a key signal sensor for identifying the particular one of said stations at which a key is depressed.

7. The invention recited in claim 5 wherein said detecting means is responsive to a susequent key depression at either the originating or the called station for disabling said connecting means thereby extinguishing the message waiting indication as well as the status indication at the respective stations.

8. The invention set forth in claim 7 wherein said detecting means includes a counter for lighting or extinguishing visual indications at the called and at the originating stations in accordance with a preordered sequence.

9. In combination in a key telephone system, an arrangement for controlling message waiting visual indications as well as status indications between two stations comprising, a nonlocking key and lamp at each station set, a lamp signaling path as well as a key signaling path connected respectively to said lamp and to said key at each of said stations and connected to a lamp control circuit, said circuit comprising, a. a counter connected to said key signaling paths for recording key depressions detected thereover, b. a sensor connected to said key signaling paths for identifying the station at which a key is depressed, and c. a network interconnecting said lamp signaling paths and being under joint control of said sensor and said counter, and a lamp signal generator having first and second outputs, said first output being connectable via said network to a called one of said stations and said second output being connectable via said network to a signal originating of a said station.

* * * * *